(12) United States Patent
Murai et al.

(10) Patent No.: US 12,503,251 B2
(45) Date of Patent: Dec. 23, 2025

(54) INSPECTION DEVICE AND INSPECTION SYSTEM

(71) Applicant: MITSUBISHI HEAVY INDUSTRIES, LTD., Tokyo (JP)

(72) Inventors: Tomohiro Murai, Tokyo (JP); Takaaki Hashino, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/678,296

(22) Filed: May 30, 2024

(65) Prior Publication Data
US 2025/0066040 A1  Feb. 27, 2025

(30) Foreign Application Priority Data

Aug. 23, 2023  (JP) .................... 2023-135709

(51) Int. Cl.
| | |
|---|---|
| B64F 5/60 | (2017.01) |
| B29C 65/00 | (2006.01) |
| B64F 5/40 | (2017.01) |
| G01N 19/04 | (2006.01) |

(52) U.S. Cl.
CPC ............ B64F 5/60 (2017.01); B29C 66/90 (2013.01); B64F 5/40 (2017.01); G01N 19/04 (2013.01)

(58) Field of Classification Search
CPC ... B64F 5/60; B64F 5/40; B29C 66/90; G01N 19/04; F16L 55/18
See application file for complete search history.

(56) References Cited

U.S. PATENT DOCUMENTS

| | | | | |
|---|---|---|---|---|
| 5,018,451 A | * | 5/1991 | Hapstack | F16L 55/34 104/138.2 |
| 6,427,602 B1 | * | 8/2002 | Hovis | F16L 55/34 104/138.1 |
| 8,950,338 B2 | * | 2/2015 | Early | F16L 55/34 104/138.1 |
| 9,353,902 B2 | * | 5/2016 | Early | F16L 55/265 |
| 2006/0266134 A1 | * | 11/2006 | MacMillan | F16L 55/30 73/865.8 |
| 2012/0177809 A1 | * | 7/2012 | Solie | F16L 58/1027 118/713 |

(Continued)

FOREIGN PATENT DOCUMENTS

| | | |
|---|---|---|
| JP | 6071359 B2 | 2/2017 |
| JP | 2020-104443 A | 7/2020 |

*Primary Examiner* — Kyle A Cook
(74) *Attorney, Agent, or Firm* — HAUPTMAN HAM, LLP

(57) ABSTRACT

An inspection device includes a base facing, in a first direction, a surface to be inspected, a contact section mounted on the base and configured to contact with a seal on the surface, a biasing device mounted on the base and configured to bias the contact section in a second direction, and a reciprocating mechanism at an end portion of the base on the one side and configured to move the base in the second direction. The biasing device includes a rotary shaft extending in a third direction, an arm being rotatable about the rotary shaft, extending at both sides in the second direction with respect to the rotary shaft, and included with the contact section at an end portion on the one side, and a biasing member at an end portion of the arm on the other side and configured to move the contact section in the second direction.

8 Claims, 11 Drawing Sheets

(56) References Cited

U.S. PATENT DOCUMENTS

2018/0363828 A1* 12/2018 Liu ................. B25J 9/1694
2019/0302034 A1* 10/2019 Watanabe ............ G01N 21/954
2020/0109811 A1* 4/2020 Hernandez ........... B25J 11/0075
2020/0207037 A1    7/2020 Tajiri
2023/0128262 A1* 4/2023 Colaw .................... F16L 55/30
                                                    73/865.8

* cited by examiner

INSPECTION DEVICE AND INSPECTION SYSTEM

CROSS-REFERENCE TO RELATED APPLICATIONS

This application claims the benefit of priority to Japanese Patent Application Number 2023-135709 filed on Aug. 23, 2023. The entire contents of the above-identified application are hereby incorporated by reference.

TECHNICAL FIELD

The present disclosure relates to an inspection device and an inspection system.

RELATED ART

JP 2020-104443 A discloses a structure of an aircraft wing. The wing includes an outer panel and a stringer. The outer panel and the stringer are stacked on top of each other. The stringer includes a connection part connected with the outer panel and a projection that is spaced apart from the outer panel. A hollow space is formed between the projection and the outer panel.

JP 6071359 B discloses a method of manually applying sealant to a defect using a brush to repair the defect.

SUMMARY

When a defect occurs in the hollow space between the outer panel and the stringer, sealing is performed using a brush as described above. It is necessary to inspect adhesion of the seal. However, since the hollow space is very narrow, it is difficult to manually inspect the seal, which has been a problem.

The present disclosure has been made to solve the above problem, and an object of the present disclosure is to provide an inspection device and an inspection system that can automate seal inspection.

According to an embodiment of the present disclosure, an inspection device according to the present disclosure includes a base arranged facing, in a first direction, a surface to be inspected to which sealant is applied, a contact section mounted on the base and configured to come into contact with a seal on the surface to be inspected from one side in a second direction intersecting the first direction, a biasing device mounted on the base and configured to bias the contact section in a direction from one side to another side in the second direction, and a reciprocating mechanism provided at an end portion of the base on the one side in the second direction and configured to move the base in the second direction, in which the biasing device includes a rotary shaft extending in a third direction intersecting the first direction and the second direction, an arm being rotatable about the rotary shaft, extending at both sides in the second direction with respect to the rotary shaft, and being provided with the contact section at an end portion on the one side in the second direction, and a biasing member provided at an end portion of the arm on the other side in the second direction and configured to move the contact section from the one side to the other side in the second direction by biasing the arm.

An inspection system according to the present disclosure includes the inspection device described above, a pipe coupled to the inspection device from the second direction, and a movement mechanism configured to grip an end portion of the pipe on a side opposite to the inspection device in the second direction and move the pipe in the second direction.

According to the inspection device and the inspection system of the present disclosure, seal inspection can be automated.

BRIEF DESCRIPTION OF DRAWINGS

The disclosure will be described with reference to the accompanying drawings, wherein like numbers reference like elements.

DESCRIPTION OF EMBODIMENTS

Figure 1:
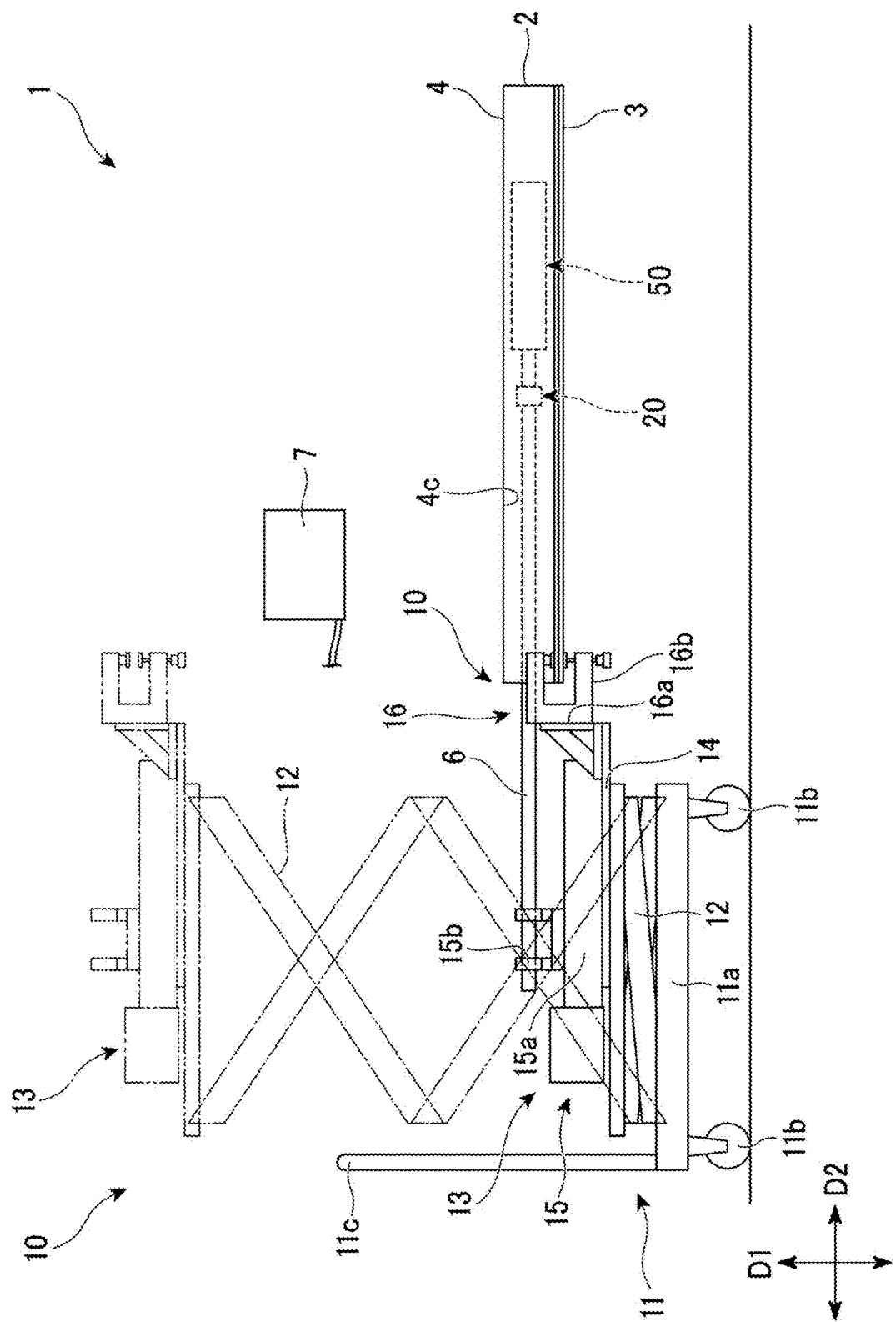
FIG. 1 is a side view illustrating a schematic configuration of an inspection system according to an embodiment of the present disclosure.

An inspection device 50 and an inspection system 1 according to an embodiment of the present disclosure will be described below with reference to FIGS. 1 to 11.

Inspection System

The inspection system 1 (see FIGS. 1 and 2) inspects adhesion of a seal formed when repairing an aircraft wing, for example. Hereinafter, the wing to be inspected is referred to as a target object 2. As illustrated in FIG. 3, the target object 2 includes an outer panel 3 and a stringer 4.

The outer panel 3 forms an outer shell of the aircraft wing. The outer panel 3 is formed in a flat plate shape, for example. The stringer 4 is attached to the outer panel 3. The stringer 4 includes a connection part 4a that connects to the outer panel 3 and a projection 4b that separates from the outer panel 3. The connection part 4a is located closer to the outer panel 3 than the projection 4b. The projection 4b is located farther from the outer panel 3 than the connection part 4a.

A hollow space (hereinafter referred to as a narrow space 4c) is formed between the projection 4b and the outer panel 3. The stringer 4 is, for example, a hat-shaped hat stringer. The outer panel 3 and the stringer 4 are made of a composite material such as glass fiber reinforced plastic (GFRP) or carbon fiber reinforced plastic (CFRP).

Figure 2:
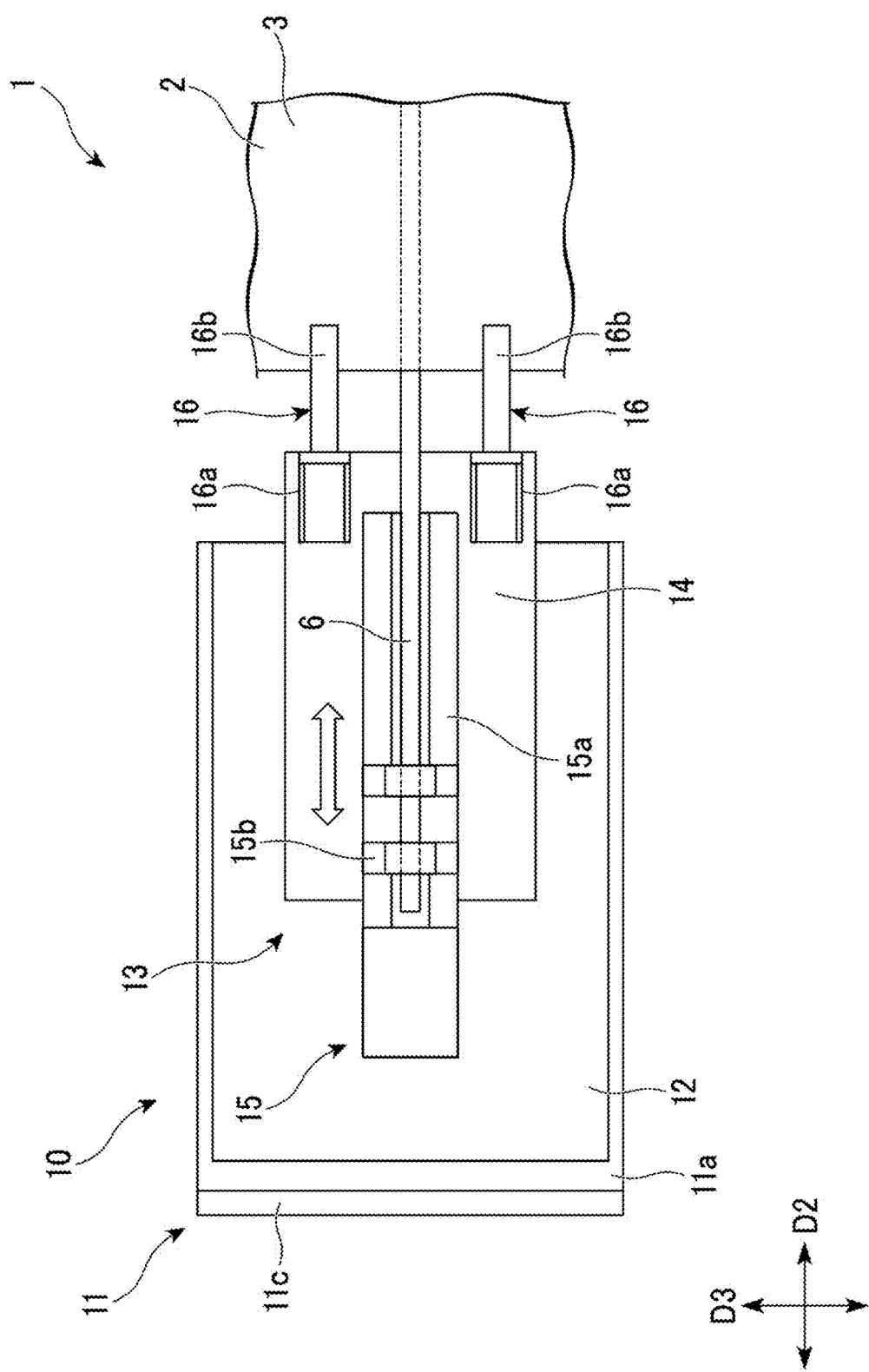
FIG. 2 is a plan view illustrating a schematic configuration of an automation device according to the embodiment of the present disclosure.
Figure 3:
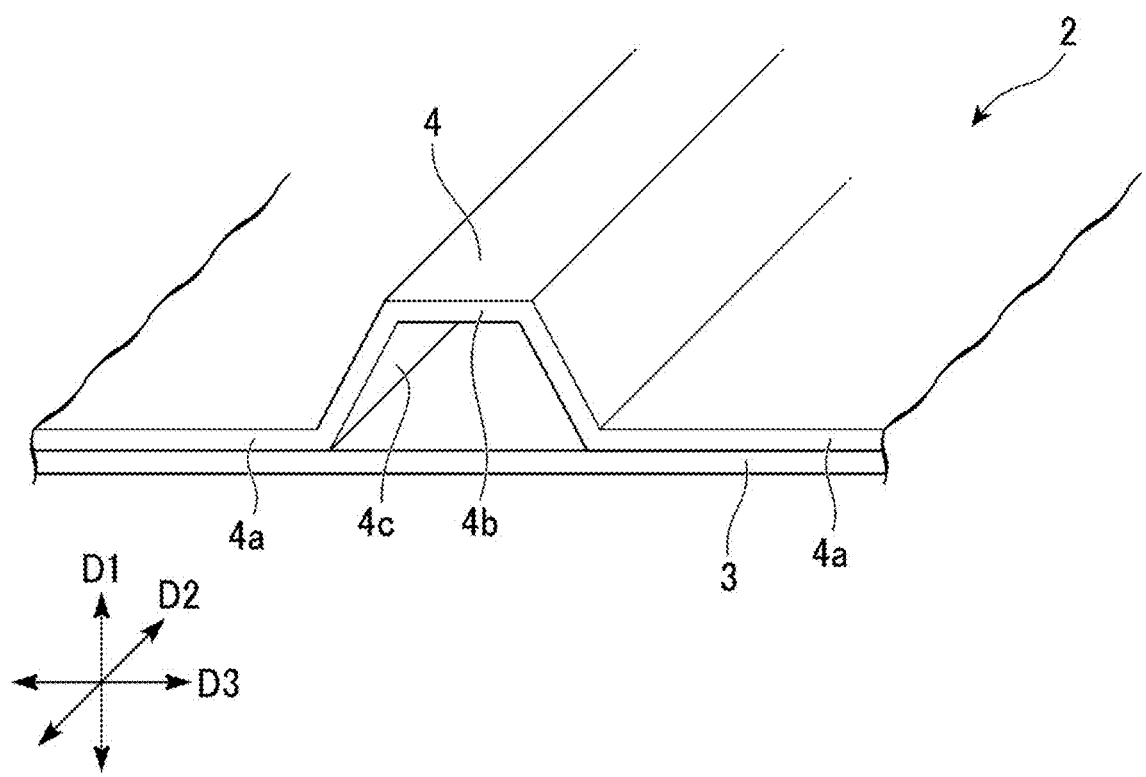
FIG. 3 is a perspective view illustrating a portion of a target object according to the embodiment of the present disclosure.
Figure 4:
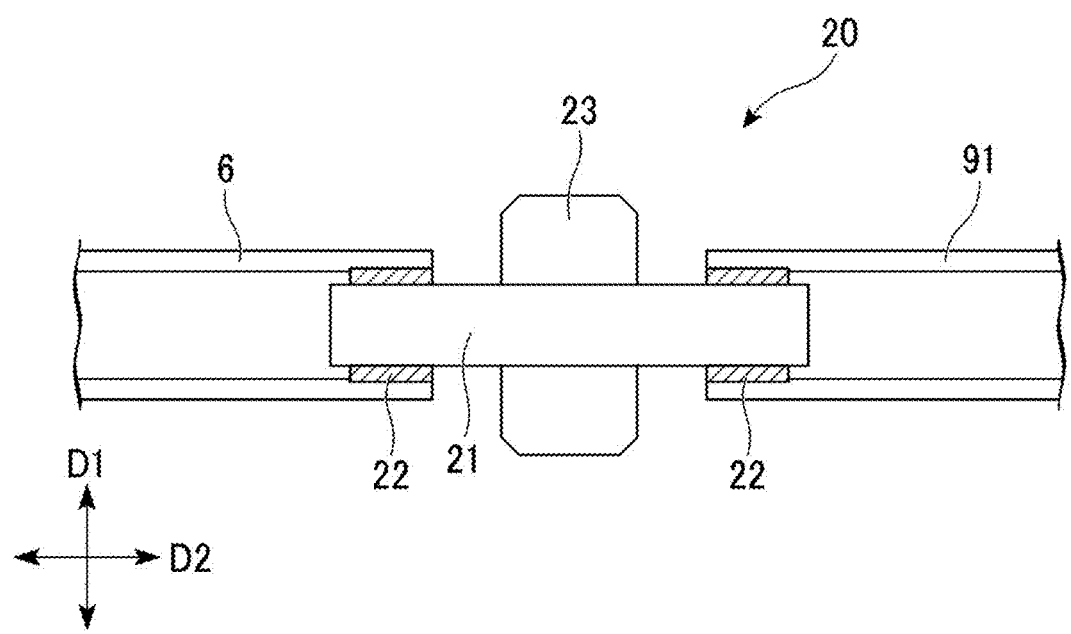
FIG. 4 is a cross-sectional view illustrating a schematic configuration of a coupling member according to the embodiment of the present disclosure.

The inspection system 1 illustrated in FIGS. 1 and 2 is used for seal inspection in the narrow space 4c between the projection 4b and the outer panel 3. The inspection system 1 inspects a seal at a surface of the stringer 4 in the narrow space 4c.

The inspection system 1 includes an inspection device 50, an automation device 10, a pipe 6, and a coupling member 20. The inspection device 50 is sent to a seal inspection position by the automation device 10, which will be described later, while inserted into the narrow space 4c. A detailed configuration of the inspection device 50 will be described later.

Hereinafter, three directions that intersect with each other are referred to as a first direction D1, a second direction D2, and a third direction D3, respectively. In the present embodiment, the first direction D1, the second direction D2, and the third direction D3 are orthogonal to each other. The first direction D1 is orthogonal to a horizontal plane, while the second direction D2 and the third direction D3 are along the horizontal plane. The first direction D1 may be slightly inclined relative to the horizontal plane, and the second direction D2 and the third direction D3 may slightly intersect the horizontal plane. In the following description, the first direction D1 may be referred to as an up-down direction, the second direction D2 may be referred to as a front-back direction, and the third direction D3 may be referred to as a left-right direction.

Automation Device

The automation device 10 automatically moves the inspection device 50 in the second direction D2. The automation device 10 includes a cart 11, a jack 12, and an automation device main body 13.

Cart

The cart 11 transfers the jack 12 and the automation device main body 13. The cart 11 includes a body 11a, casters 11b, and a handle 11c.

The body 11a is placed slightly above a floor face and extends horizontally. The body 11a is formed in a rectangular shape extending in the second direction D2 (the front-back direction) when viewed in the first direction D1 (the up-down direction).

When viewed in the first direction D1, the casters 11b are provided at four corners of the body 11a. The casters 11b are attached to the underside of the body 11a. Each caster 11b is provided so as to be able to roll on the floor face. The four casters 11b support the body 11a from below.

The handle 11c is provided at one end portion of the body 11a in the second direction D2 (a back side in the front-back direction). The handle 11c extends upward from the body 11a. An operator moves the cart 11 while gripping the handle 11c.

Jack

The jack 12 is placed on the body 11a of the cart 11. The automation device main body 13 is placed on the jack 12. The jack 12 is provided in an expandable and contractable manner in the first direction D1. Expanding and contracting the jack 12 in the first direction D1 adjusts the position of the automation device main body 13 in the first direction D1.

Automation Device Main Body

The automation device main body 13 includes a baseplate 14, a movement mechanism 15, and clamp mechanisms 16.

The baseplate 14 is placed on the jack 12.

Movement Mechanism

The movement mechanism 15 is placed on the baseplate 14. The pipe 6 coupled to the inspection device 50 is connected to the movement mechanism 15. The pipe 6 extends in the second direction D2. The movement mechanism 15 grips an end portion of the pipe 6 on a side opposite to the inspection device 50 in the second direction D2 and moves the pipe 6 in the second direction D2. The movement mechanism 15 is, for example, an electric actuator, and includes a base 15a and an actuation unit 15b. The base 15a extends in the second direction D2. The actuation unit 15b is attached to the base 15a. One end portion of the pipe 6 in the second direction D2 is fixed to the actuation unit 15b. The actuation unit 15b moves on the base 15a in the second direction D2. When the actuation unit 15b moves in the second direction D2, the pipe 6 moves in the second direction D2 and the inspection device 50 coupled to the pipe 6 also moves in the second direction D2 in conjunction with the pipe 6.

Clamp Mechanism

The clamp mechanisms 16 are provided at another end portion of the baseplate 14 in the second direction D2 (a front side in the front-back direction). A pair of clamp mechanisms 16 are provided clamping the movement mechanism 15 in the third direction D3 (the left-right direction). The clamp mechanism 16 includes a leg part 16a that stands upward from the baseplate 14, and a clamping part 16b provided at an upper end of the leg part 16a. The leg part 16a supports the clamping part 16b from below. The clamping part 16b clamps the target object 2 from both sides in the first direction D1 (the up-down direction). This prevents positional deviation of the target object 2 in the horizontal direction.

Note that the two clamp mechanisms 16 may be arranged shifted from each other in the second direction D2. With this arrangement, the automation device 10 can be used even when an end portion of the target object 2 closer to the clamp mechanisms 16 is inclined relative to the third direction D3.

Pipe

The pipe 6 extends from the actuation unit 15b of the movement mechanism 15 to the inspection device 50 in the second direction D2. The pipe 6 is coupled to the inspection device 50 from the second direction D2. The pipe 6 transmits power to move the inspection device 50 placed in the narrow space 4c between the outer panel 3 and the stringer 4 in the second direction D2 (the front-back direction). In the illustrated example, one pipe 6 is provided on one side of the inspection device 50 in the second direction D2 (the back side in the front-back direction), and the automation device 10 is provided on one side of the pipe 6 in the second direction D2 (the back side in the front-back direction).

A length L1 of the pipe 6 in the second direction D2 is designed, for example, from 1.5 m to 2.5 m and an outer diameter R1 of the pipe 6 is designed, for example, from 20 mm to 25 mm.

Coupling Member

The coupling member 20 couples the pipe 6 and a coupling pipe 91 extending from the inspection device 50 in the second direction D2.

The coupling member 20 includes a central shaft portion 21, male thread portions 22, and a flange portion 23.

Central Shaft Portion

The central shaft portion 21 extends in the second direction D2. One end portion of the central shaft portion 21 in the second direction D2 is inserted into one of the pipe 6 or the coupling pipe 91. Another end portion of the central shaft portion 21 in the second direction D2 is inserted into another of the pipe 6 and the coupling pipe 91. In the illustrated example, the back end portion of the central shaft portion 21 is inserted into the pipe 6, and the front end portion of the central shaft portion 21 is inserted into the coupling pipe 91.

Male Thread Portion

The male thread portions 22 are provided at both end portions of the central shaft portion 21 in the second direction D2. The male thread portions 22 are designed to screw into inside surfaces of the pipe 6 and the coupling pipe 91. An outer diameter of the male thread portion 22 is formed to be slightly larger than an inner diameter of the pipe 6 and an inner diameter of the coupling pipe 91. Thus, the coupling member 20 is firmly coupled to the pipe 6 and the coupling pipe 91.

Flange Portion

The flange portion 23 protrudes from an outside surface of the central shaft portion 21 at a central portion in the second direction D2 outward in a radial direction relative to the pipe 6 and the coupling pipe 91. The flange portion 23 is made of a material (such as resin) that is less hard than a surface to be inspected 5. The flange portion 23 prevents the pipe 6 and the coupling pipe 91 from coming into contact with inner surfaces in the narrow space 4c (such as the surface to be inspected 5) in the target object 2 including the outer panel 3 and the stringer 4. Note that, instead of the flange portion 23, a material having low hardness such as a film or rubber may be wound around the pipe 6 and the coupling pipe 91. Such means can also prevent the pipe 6 and the coupling pipe 91 from coming into contact with the inner surface in the narrow space 4c and causing damage.

Configuration of Inspection Device

The inspection device 50 is placed in the narrow space 4c of the target object 2. The inspection device 50 (in the illustrated example, the inspection device 50 is inserted into the narrow space 4c from the one side in the second direction D2 (the back side in the front-back direction)) performs the seal inspection of the surface to be inspected 5 coated with sealant in the narrow space 4c.

Figure 5:
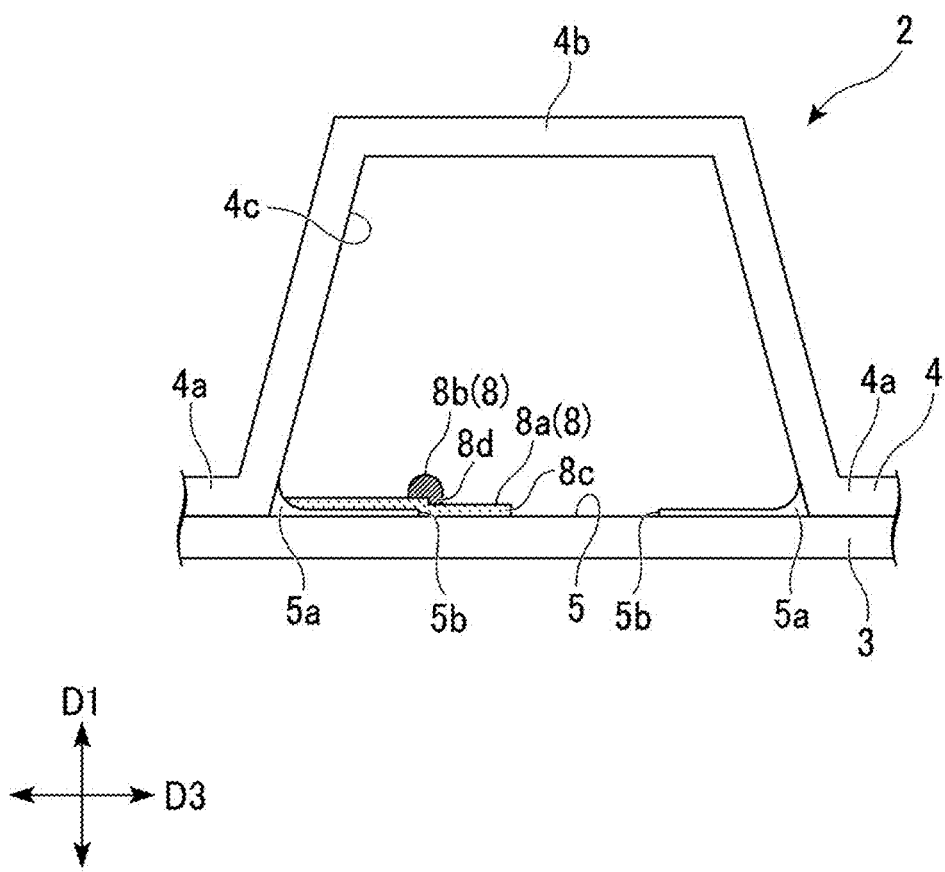
FIG. 5 is a schematic diagram illustrating seals according to the embodiment of the present disclosure.

As illustrated in FIG. 5, in the present embodiment, the seal inspection is performed with the target object 2 placed so that the outer panel 3 is located below the stringer 4. Hereinafter, a surface of the outer panel 3 on which the seal inspection is performed is referred to as the surface to be inspected 5.

In the narrow space 4c, a joining part 5a for smoothly joining the outer panel 3 and the stringer 4 is provided. The joining part 5a extends in the third direction D3 on the surface to be inspected 5, and is formed so as to become gradually thinner from the connection part 4a of the stringer 4 toward an inner side of the narrow space 4c in the third direction D3. A boundary portion of the joining part 5a at a boundary between the joining part 5a and the surface to be inspected 5 (hereinafter referred to as an edge 5b) slightly protrudes from the surface to be inspected 5. A seal 8 is formed covering the edge 5b.

The seals 8 in the present embodiment are a brush coat 8a and an edge seal 8b. The brush coat 8a is the seal 8 that is formed in a flat shape by applying sealant to the surface to be inspected 5 using a brush (not illustrated). The brush coat 8a is formed on a top surface of the joining part 5a. The brush coat 8a extends in the third direction D3 and covers the edge 5b. The edge seal 8b is the seal 8 formed on the brush coat 8a at a position overlapping the edge 5b in the first direction D1. The edge seal 8b is formed thicker in the first direction D1 than the brush coat 8a. The inspection device 50 can inspect adhesion of the brush coat 8a to the surface to be inspected 5 by applying a pressing force in the second direction D2 to a boundary portion 8c of the brush coat 8a at a boundary between the brush coat 8a and the surface to be inspected 5. The inspection device 50 can also inspect adhesion of the edge seal 8b to the brush coat 8a by applying a pressing force in the second direction D2 to a boundary portion 8d of the edge seal 8b at a boundary between the edge seal 8b and the brush coat 8a.

Figure 6:
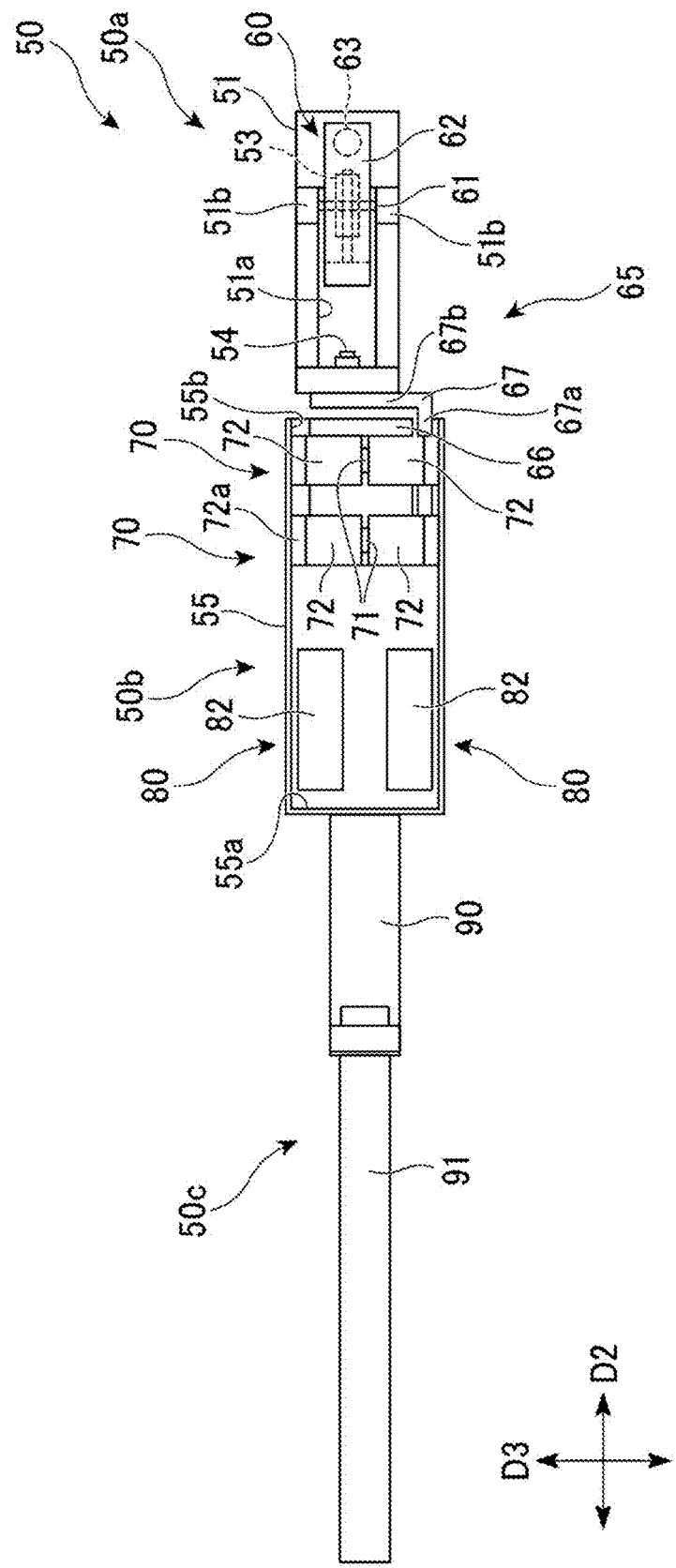
FIG. 6 is a diagram illustrating a schematic configuration of an inspection device according to the embodiment of the present disclosure.
Figure 7:
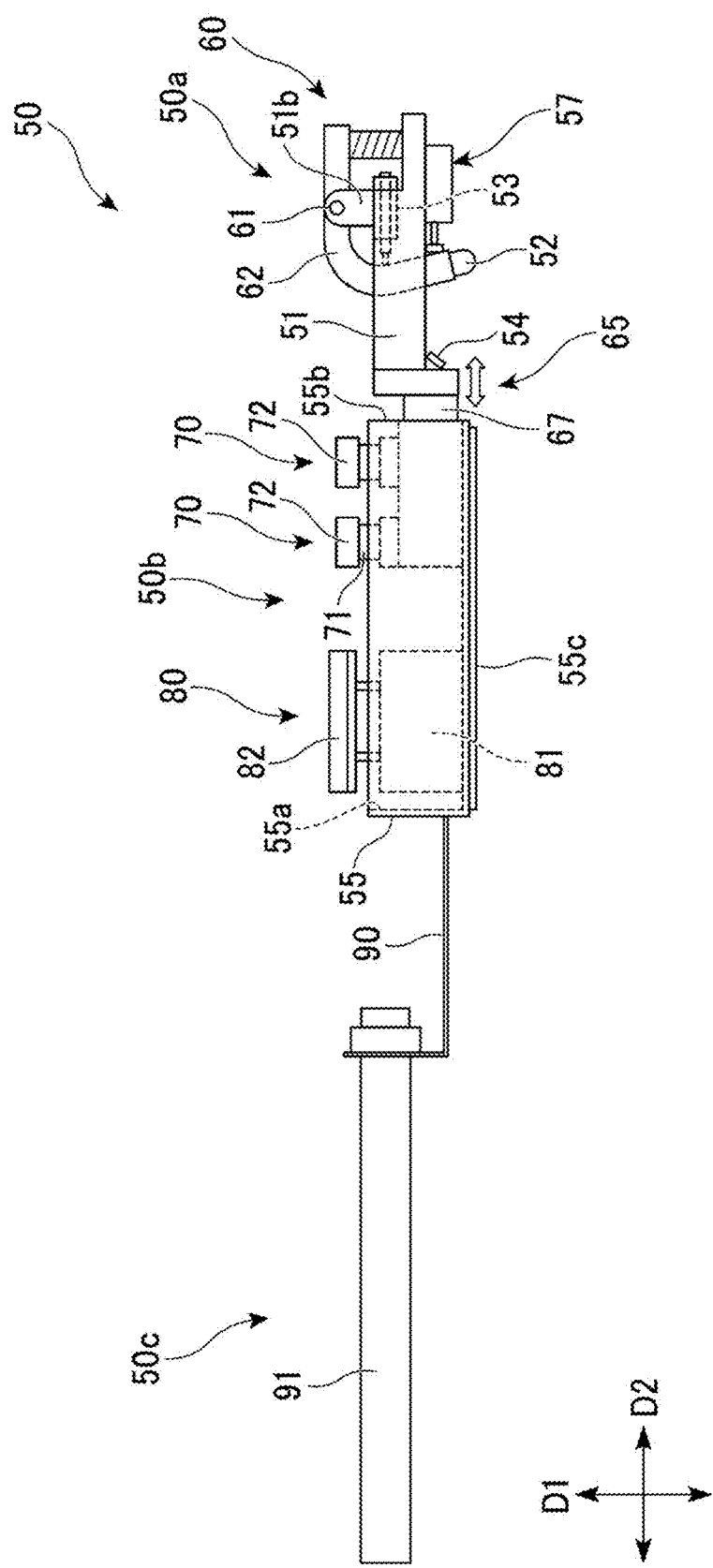
FIG. 7 is a diagram illustrating a schematic configuration of the inspection device according to the embodiment of the present disclosure.

As illustrated in FIGS. 6 and 7, the inspection device 50 includes an inspection unit 50a and an inspection device base unit 50b placed side by side on the one side of the inspection unit 50a in the second direction D2 (the back side in the front-back direction).

Inspection Unit

The inspection unit 50a includes a base 51, a contact section 52, a biasing device 60, a stopper 53, a sensor unit 54, and a retraction mechanism 57.

Base

The base 51 is placed facing the surface to be inspected 5 in the first direction D1 (the up-down direction). The base 51 extends in the second direction D2 (the front-back direction). The base 51 is provided with a through-hole 51a extending through the base 51 in the first direction D1. A pair of attachment portions 51b are provided on a top surface of the base 51 facing each other in the third direction D3 (the left-right direction) with the through-hole 51a in between. The base 51 is attached to a bracket 67, which will be described later. The base 51 is provided such that an attachment position thereof is adjustable in the third direction D3.

Contact Section

The contact section 52 is mounted on the base 51 via the biasing device 60, which will be described later. The contact section 52 comes into contact with the seal 8 on the surface to be inspected 5 from the one side (the back side in the front-back direction) in the second direction D2 intersecting the first direction D1. The contact section 52 is made of an elastic material such as rubber, for example. The contact section 52 protrudes toward the surface to be inspected 5 in the first direction D1. A tip portion 52a of the contact section 52 closer to the surface to be inspected 5 is formed in a spherical shape. The inspection device 50 inspects the adhesion of the seal 8 by pressing the contact section 52 against the seal 8 from the one side to the other side in the second direction D2 (from the back side to the front side in the front-back direction).

Biasing Device

Figure 8:
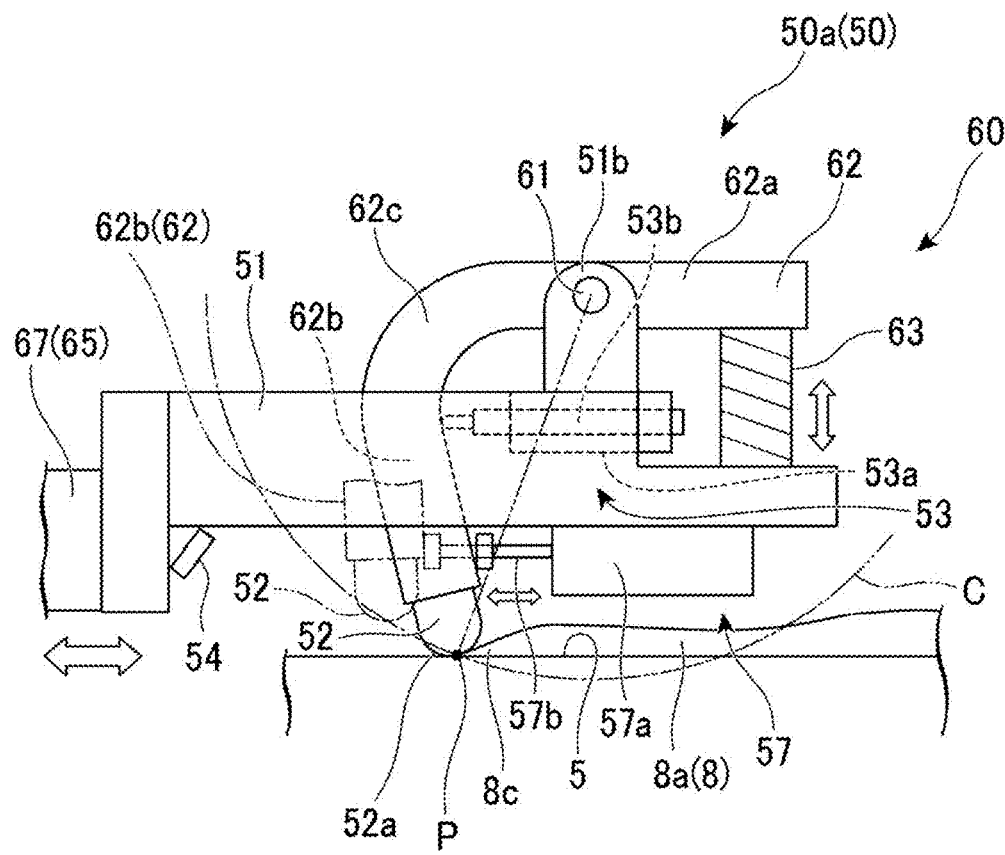
FIG. 8 is an enlarged view illustrating an inspection unit according to the embodiment of the present disclosure.
Figure 8:
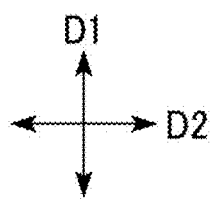

The biasing device 60 is mounted on the base 51. The biasing device 60 biases the contact section 52 in a direction from the one side to the other side in the second direction D2. As illustrated in FIG. 8, the biasing device 60 includes a rotary shaft 61, an arm 62, and a biasing member 63.

Rotary Shaft

The rotary shaft 61 is provided on the opposite side, in the first direction D1, to the contact section 52 during inspection in the second direction D2, with respect to the base 51, and extends in the third direction D3.

Arm

The arm 62 is attached to the rotary shaft 61 and is configured to rotate about the rotary shaft 61. The arm 62 extends on both sides in the second direction D2 with respect to the rotary shaft 61. The contact section 52 is provided at one end portion of the arm 62 in the second direction D2, and the biasing member 63, which will be described later, is provided at another end portion of the arm 62 in the second direction D2.

The arm 62 in the present embodiment is formed in an L shape when viewed in the third direction D3. The arm 62 includes an arm first portion 62a, an arm second portion 62b, and an arm curved portion 62c. The arm first portion 62a is attached to the rotary shaft 61 and extends in one direction along the second direction D2. The arm second portion 62b is provided on the one side of the arm first portion 62a in the second direction D2 and extends toward the surface to be inspected 5 in one direction along the first direction D1. The arm second portion 62b is inserted into the through-hole 51a of the base 51. The arm curved portion 62c connects the arm first portion 62a and the arm second portion 62b. An angle between the arm first portion 62a and the arm second portion 62b is slightly smaller than 90 degrees. The contact section 52 is attached to an end portion of the arm second portion 62b closer to the surface to be contacted. The biasing member 63 is attached to an end portion of the arm first portion 62a on the other side in the second direction D2.

Biasing Member

The biasing member 63 biases the arm 62 so that the contact section 52 moves from the one side to the other side in the second direction D2 (from the back side to the front side in the front-back direction).

The biasing member 63 in the present embodiment is a spring coil that expands and contracts in the first direction D1, and biases the contact section 52 with a spring force via the arm 62. Note that the biasing force (spring force) of the biasing member 63 is set to a value close to a manual biasing force (e.g., a value from 10 N to 15 N).

The biasing member 63 extends in the first direction (the up-down direction), and connects the base 51 located below and the arm first portion 62a located above. The biasing member 63 biases the arm first portion 62a from the other side to the one side in the second direction D2 (from the front side to the back side in the front-back direction). This allows the arm 62 to rotate around the rotary shaft 61 and the arm second portion 62b to bias the contact section 52 from the one side to the other side in the second direction D2 (from the back side to the front side in the front-back direction).

By the biasing device 60 described above, the contact section 52 can rotate about the rotary shaft 61. An end point P of the contact section 52 farthest from the arm second portion 62b draws an arc-shaped trajectory C around the rotary shaft 61.

Stopper

The stopper 53 is mounted on the base 51. The stopper 53 is in contact with an end portion of the arm 62 (the arm second portion 62b) on the one side in the second direction D2 (the back side in the front-back direction) from the other side in the second direction D2 (the front side in the front-back direction).

Sensor Unit

The sensor unit 54 is mounted on the base 51. The sensor unit 54 is provided at an end portion of the through-hole 51a on the one side in the second direction D2 (the back side in the front-back direction) when viewed in the first direction D1 (when viewed in the up-down direction). The sensor unit 54 is installed facing the contact section 52 side in the second direction D2. The sensor unit 54 detects a position of the contact section 52. The sensor unit 54 in the present embodiment is a camera that takes pictures of the contact section 52 and the vicinity of the contact section 52 (such as the seal 8) from the one side in the second direction D2 (the back side in the front-back direction).

Retraction Mechanism

The retraction mechanism 57 is mounted on the base 51. The retraction mechanism 57 is in contact with the end portion of the arm 62 (the arm second portion 62b) on the one side in the second direction D2 (the back side in the front-back direction) from the other side in the second direction D2 (the front side in the front-back direction). The retraction mechanism 57 includes a retraction mechanism base unit 57a and an expanding/retracting section 57b that extends from the retraction mechanism base unit 57a in the second direction D2. The expanding/retracting section 57b is provided to be extendable and retractable in the second direction D2. The expanding/retracting section 57b, when extended, biases the arm 62 in the direction from the other side to the one side in the second direction D2 (from the front side to the back side in the front-back direction). The retraction mechanism 57 is an air cylinder in which the expanding/retracting section 57b extends and retracts in the second direction D2 using air as a working fluid. Note that the retraction mechanism 57 may be a hydraulic cylinder.

Inspection Device Base Unit

The inspection device base unit 50b includes a casing 55, a reciprocating mechanism 65, centering mechanisms 70, and brake mechanisms 80.

Casing

Figure 9:
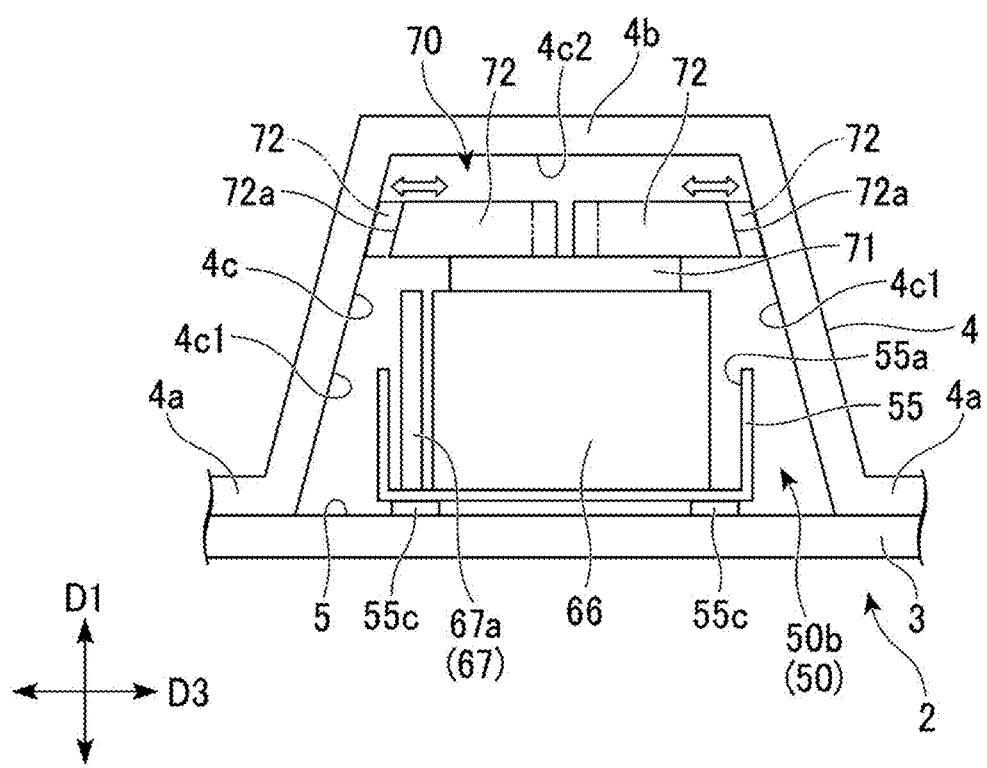
FIG. 9 is a diagram illustrating a schematic configuration of a centering mechanism according to the embodiment of the present disclosure.

The casing 55 extends in the second direction D2. The casing 55 is formed in a box shape having an opening 55a opening in the first direction D1. In the present embodiment, the casing 55 is formed in a cubic shape extending in the second direction D2. A pull-out hole 55b passing through the casing 55 in the second direction D2 is formed at an end portion of the casing 55 on the other side in the second direction D2 (the front side in the front-back direction). As illustrated in FIG. 9, cushioning members 55c are provided on a surface of the casing 55 on a side opposite to the opening 55a in the first direction D1 (the underside facing the surface to be inspected 5). A pair of cushioning members 55c are provided facing each other in the third direction D3. Each cushioning member 55c is formed in a straight line extending in the second direction D2. It is desirable that the cushioning member 55c be slidable on the surface to be inspected 5 and made of a material having a lower hardness than the surface to be inspected 5.

Reciprocating Mechanism

The reciprocating mechanism 65 is provided at an end portion of the base 51 on the one side in the second direction D2 (the back side in the front-back direction). The reciprocating mechanism 65 includes a first actuator 66 and the bracket 67. The first actuator 66 is housed in the casing 55 and located near the pull-out hole 55b. The bracket 67 is attached to the first actuator 66. The bracket 67 is formed in an L shape when viewed in the first direction D1 (when viewed in the up-down direction). The bracket 67 includes a bracket first portion 67a and a bracket second portion 67b. The bracket first portion 67a is arranged side by side with the first actuator 66 in the third direction D3 (the left-right direction) and extends in a straight line in the second direction D2. The bracket first portion 67a is pulled out of the casing 55 through the pull-out hole 55b. The bracket first portion 67a can be moved in the second direction D2 by the first actuator 66. The bracket second portion 67b is provided at an end portion of the bracket first portion 67a on the other side in the second direction D2 (the front side in the front-back direction), and extends from the bracket first portion 67a in the third direction D3. The bracket second portion 67b is located on the other side of the first actuator 66 in the second direction D2. The base 51 of the inspection unit 50a is attached to the bracket second portion 67b.

When the first actuator 66 is actuated, the bracket 67 moves in the second direction D2, and the base 51 also moves together with the bracket 67 in the second direction D2. In this way, the reciprocating mechanism 65 can move the base 51 in the second direction D2. Note that force of the reciprocating mechanism 65 in the second direction D2 that moves the base 51 is set to a value larger than a set value of reaction force that the contact section 52 receives from the seal 8.

Centering Mechanism

The centering mechanisms 70 are positioned at fixed positions relative to the contact section 52 in the third direction D3 (the left-right direction). The centering mechanisms 70 position the contact section 52 in the third direction D3. The centering mechanisms 70 are located on the reciprocating mechanism 65. Two centering mechanisms 70 are provided side by side in the second direction D2 (the front-back direction). The centering mechanisms 70 protrude from the opening 55a of the casing 55 in the first direction D1. The centering mechanism 70 includes a second actuator 71 and centering blocks 72.

As illustrated in FIG. 9, the second actuator 71 are placed on the first actuator 66.

The centering blocks 72 are placed on the second actuator 71 and are located above the opening 55a of the casing 55. A pair of centering blocks 72 are provided facing each other in the third direction D3. Each of the centering blocks 72 is movable in the third direction D3. In the present embodiment, the pair of centering blocks 72 facing each other in the third direction D3 are interlocked by the second actuator 71 and move toward and away from each other in the third direction D3.

A side surface of the centering block 72 facing outward in the third direction D3 is an inclined surface 72a that is inclined along a shape of a side wall surface 4c1 in the narrow space 4c, which faces the inclined surface 72a in the third direction D3. The centering blocks 72 move outward in the third direction D3, and the inclined surfaces 72a are pressed against the side wall surfaces 4c1, thereby positioning the inspection device 50 in the third direction D3. In order to prevent scratches in the narrow space 4c, the centering block 72 is made of a material having lower hardness than the target object 2, which is a product.

Brake Mechanism

Figure 10:
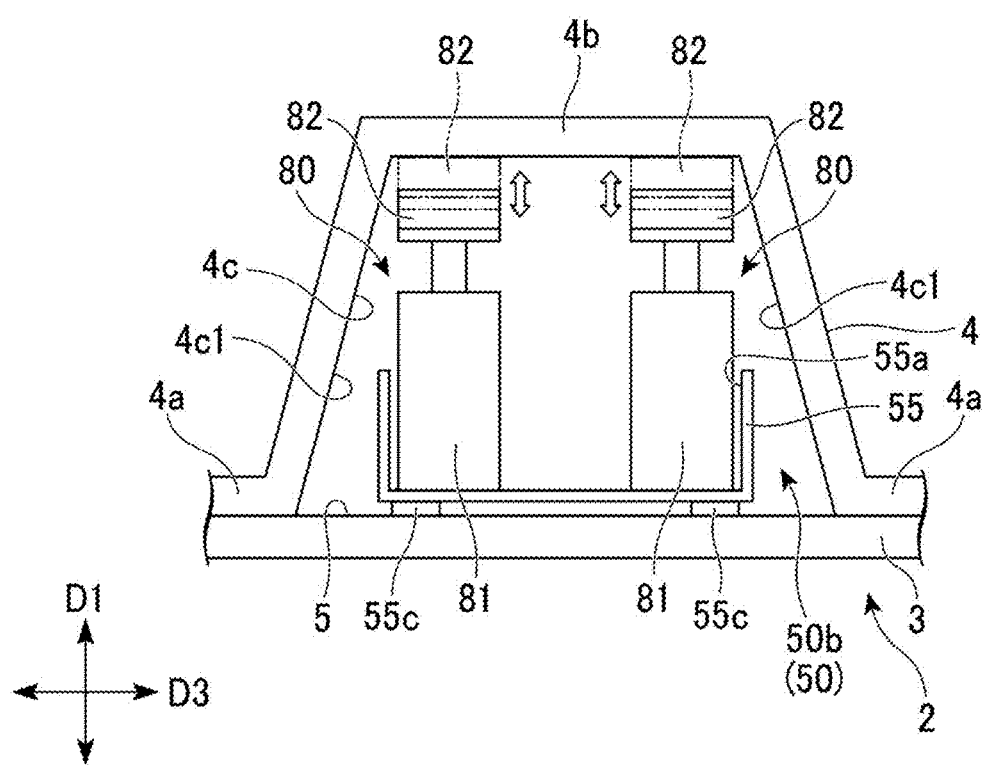
FIG. 10 is a diagram illustrating a schematic configuration of a brake mechanism according to the embodiment of the present disclosure.

The brake mechanisms 80 are positioned at fixed positions relative to the contact section 52 in the first direction D1 (the up-down direction) and the third direction D3 (the left-right direction), and prevent positional deviation in the second direction D2 (the front-back direction). The brake mechanisms 80 are housed in the casing 55 and are located on the one side in the second direction D2 relative to the reciprocating mechanism 65 and the centering mechanisms 70 (the back side in the front-back direction). As illustrated in FIG. 10, two brake mechanisms 80 are provided side by side in the third direction D3. Each brake mechanism 80 is designed to extend in the second direction D2. The brake mechanism 80 includes a third actuator 81 and a brake block 82.

The third actuators 81 are placed on a bottom surface of the casing 55.

The brake block 82 is placed on the third actuator 81 and is located above the opening 55a of the casing 55. The brake block 82 is movable by the third actuator 81 in a direction intersecting the second direction D2 (the first direction D1 in the present embodiment). The brake blocks 82 are pressed by the third actuators 81 against an upper wall surface 4c2 in the narrow space 4c (an inner surface in the narrow space 4c facing the surface to be inspected 5 in the first direction D1). Thus, the inspection device 50 is fixed in the second direction D2, and positional deviation in the second direction D2 is prevented. The brake block 82 is desirably made of a material that has a lower hardness than the target object 2, which is a product made of urethane or the like, and a higher gripping force.

Pipe Attachment Unit

The pipe 6 is attached to a pipe attachment unit 50c via the coupling member 20 described above. The pipe attachment unit 50c is provided on the one side of the casing 55 in the second direction D2 (the back side in the front-back direction). The pipe attachment unit 50c includes a connection part 90 and the coupling pipe 91. The connection part 90 is connected to the casing 55. The connection part 90 extends from a side surface of the casing 55 facing the one side in the second direction D2 to the one side in the second direction D2.

Coupling Pipe

The coupling pipe 91 is arranged in line with the casing 55 on the one side in the second direction D2 (the back side in the front-back direction). The coupling pipe 91 extends from an end portion of the connection part 90 on the one side in the second direction D2 to the one side in the second direction D2. The coupling pipe 91 is coupled to the pipe 6 via the coupling member 20 described above.

Controller

The controller 7 is wired to the inspection device 50 by a cable (not illustrated). The controller 7 may be wirelessly connected to the inspection device 50. For example, the operator can operate the controller 7 to activate the reciprocating mechanism 65, the centering mechanisms 70, and the brake mechanisms 80 of the inspection device 50.

Procedure of Inspection Method

Figure 11:
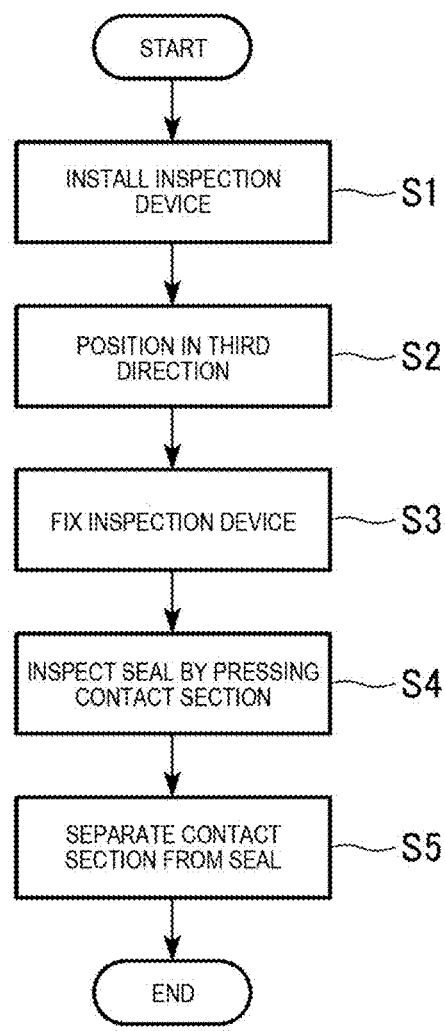
FIG. 11 is a flowchart illustrating a procedure of an inspection method according to the embodiment of the present disclosure.

The inspection method according to the present embodiment will be described with reference to a flow in FIG. 11. For example, when a defect occurs in the narrow space 4c between the outer panel 3 and the stringer 4 included in the target object 2 (aircraft wing), sealant is applied to repair. Hereinafter, a procedure for inspecting adhesion of the seal 8 formed by applying the sealant to repair will be described.

First, with the target object 2 placed such that the outer panel 3 is on the lower side and the stringer 4 is on the upper side, the automation device 10 is activated to insert the inspection device 50 into the narrow space 4c from the one side in the second direction D2 (the back side in the front-back direction), and the inspection device 50 is installed on the surface to be inspected 5 (step S1). In step S1, the retraction mechanism 57 is extended to push the arm 62, retracting the contact section 52 upward. After step S1, the centering mechanisms 70 are activated to move the centering blocks 72 in the third direction D3 (the left-right direction) to press the centering blocks 72 against the side wall surfaces 4c1 in the narrow space 4c, thereby positioning the contact section 52 in the third direction D3 (step S2). In step S2, the contact section 52 is placed at the same position as the seal 8 in the third direction D3.

After step S2, the brake mechanisms 80 are activated to press the brake blocks 82 against the upper wall surface 4c2 of the inner surfaces in the narrow space 4c facing the surface to be inspected 5, thereby fixing the inspection device 50 (step S3). In step S3, the brake mechanisms 80 function as tension rods.

After step S3, the reciprocating mechanism 65 is activated to press the contact section 52 against the seal 8 to inspect the seal 8 (step S4). In step S4, the reciprocating mechanism 65 moves the inspection unit 50a from the one side to the other side in the second direction D2 (from the back side to the front side in the front-back direction). Then, as illustrated in FIG. 8, the end point P of the contact section 52 is pressed so as to be rubbed against the boundary portion 8c of the seal 8 at the boundary between the seal 8 and the surface to be inspected 5. When the seal 8 does not peel off, it can be determined that the adhesion is sufficiently ensured.

After step S4, the retraction mechanism 57 is extended to separate the contact section 52 from the seal 8 (step S5). After step S5, the inspection device 50 may be taken out, or the inspection device 50 may be moved to start inspection of another inspection point. In order to prevent stacking, it is desirable to always extend the retraction mechanism 57 to retract the contact section 52 while the inspection device 50 is moving.

Through the above steps, the inspection of the adhesion of the seal 8 is completed.

Here, the inspection method has been described with an example in which the inspection device 50 inspects the adhesion of the brush coat 8a by pressing the contact section 52 against the boundary portion 8c of the seal 8 (brush coat 8a) at the boundary between the seal 8 and the surface to be inspected 5. However, the inspection method is not limited to this. The inspection device 50 can also inspect the adhesion of the edge seal 8b by pressing the contact section 52 against the boundary portion 8d of the edge seal 8b at the boundary between the edge seal 8b and the brush coat 8a.

Operational Effects

The inspection device 50 and the inspection system 1 in the present embodiment can achieve the following operational effects.

In the present embodiment, the inspection device 50 includes the base 51 arranged facing, in the first direction D1, the surface to be inspected 5 to which the sealant is applied, the contact section 52 mounted on the base 51 and configured to come into contact with the seal 8 on the surface to be inspected 5 from the one side in the second direction D2 intersecting the first direction D1, the biasing device 60 mounted on the base 51 and configured to bias the contact section 52 in the direction from the one side to the other side in the second direction D2, and the reciprocating mechanism 65 provided at the end portion of the base 51 on the one side in the second direction D2 and configured to move the base 51 in the second direction D2. The biasing device 60 includes the rotary shaft 61 extending in the third direction D3 intersecting the first direction D1 and the second direction D2, the arm 62 being rotatable about the rotary shaft 61, extending at both sides in the second direction D2 with respect to the rotary shaft 61, and being provided with the contact section 52 at the end portion on the one side in the second direction D2, and the biasing member 63 provided at the end portion of the arm 62 on the other side in the second direction D2 and configured to move the contact section 52 from the one side to the other side in the second direction D2 by biasing the arm 62.

When the reciprocating mechanism 65 moves the base 51 from the one side to the other side in the second direction D2, the contact section 52 is pressed against the seal 8 in the direction from the one side to the other side in the second direction D2. At this time, the contact section 52 receives the force from the seal 8 in the direction from the other side to the one side in the second direction D2. However, the arm 62 rotates around the rotary shaft 61, causing the contact section 52 to move upward away from the seal 8. Accordingly, the force that the contact section 52 receives from the seal 8 can be released. On the other hand, since the biasing member 63 biases the arm 62 so that the contact section 52 moves from the one side to the other side in the second direction D2, the contact section 52 can be pressed against the seal 8 with the certain force or more. Therefore, the contact section 52 can be pressed against the seal 8 with the desired force while avoiding applying the force equal to or greater than the set value to the contact section 52 due to rotation of the arm 62.

Thus, the contact section 52 can be pressed against the boundary portion 8c of the brush coat 8a at the boundary between the brush coat 8a and the surface to be inspected 5 with the appropriate force less than the set value. The contact section 52 can be pressed also against the boundary portion 8d of the edge seal 8b at the boundary between the edge seal 8b and the brush coat 8a with the appropriate force less than the set value.

Thus, according to the present embodiment, the inspection of the adhesion of the seal 8 can be performed automatically while avoiding applying the force equal to or greater than the set value to the contact section 52. Therefore, the seal inspection can be safely automated.

In the present embodiment, the inspection device 50 further includes the retraction mechanism 57, the retraction mechanism 57 being mounted on the base 51, in contact with the end portion of the arm 62 on the one side in the second direction D2 from the other side in the second direction D2, expandable and retractable in the second direction D2, and configured to bias the arm 62 in the direction from the other side to the one side in the second direction D2 when expanded.

For example, when the contact section 52 receives an excessive reaction force from the seal 8, the retraction mechanism 57 extends to bias the arm 62 in the direction from the other side to the one side in the second direction D2. Thus, the contact section 52 can be completely retracted from the seal 8. Therefore, it is possible to reliably avoid applying the force equal to or greater than the set value to the contact section 52, thereby further improving safety.

Further, since the contact section 52 can be immediately separated from the seal 8 after the seal inspection, it is possible to quickly proceed to the next seal inspection.

In the present embodiment, the inspection device 50 further includes the sensor unit 54 mounted on the base 51 and configured to detect the position of the contact section 52.

Accordingly, even when the seal 8 cannot be visually recognized with the naked eye, the contact section 52 can be accurately pressed against the seal 8 to perform the seal inspection. Therefore, it is possible to improve convenience and accuracy of the seal inspection. In the present embodiment, it is possible to directly check whether the seal 8 is peeled off from outside the narrow space 4c.

In the present embodiment, the inspection device 50 further includes the centering mechanisms 70 positioned at the fixed positions relative to the contact section 52 in the third direction D3 and configured to position the contact section 52 in the third direction D3. Each centering mechanism 70 includes the centering blocks 72 provided facing each other in the third direction D3 and being individually movable in the third direction D3.

For example, when the wall surfaces exist on both sides of the inspection device 50 in the third direction D3, the centering mechanisms 70 can be activated to press the pair of centering blocks 72 against the wall surfaces. At this time, by adjusting the positions of both the centering blocks 72 in the third direction D3, the contact section 52 can be positioned in the third direction D3 so that the sensor unit 54 and the contact section 52 are aligned in the third direction D3. Therefore, the contact section 52 can be accurately pressed against the seal 8, further improving the accuracy of the seal inspection.

In the present embodiment, the inspection device 50 further includes the brake mechanism 80 positioned at the fixed position relative to the contact section 52 in the first direction D1 and the third direction D3, and configured to help prevent positional deviation in the second direction D2. The brake mechanism 80 includes the brake block 82 movable in the direction intersecting the second direction D2.

According to the configuration described above, the brake mechanism 80 can be activated to press the brake block 82 against the upper wall surface 4c2. Accordingly, it is possible to suppress the positional deviation of the inspection device 50 in the second direction D2 against the reaction force that the contact section 52 receives from the seal 8. Therefore, it is possible to avoid a decrease in the pressing force applied to the seal 8 due to the positional deviation of the contact section 52 during the seal inspection, so that the accuracy of the seal inspection can be further improved.

In the present embodiment, the inspection system 1 includes the inspection device 50, the pipe 6 coupled to the inspection device 50 from the second direction D2, and the movement mechanism 15 configured to grip the end portion of the pipe 6 on the side opposite to the inspection device 50 in the second direction D2 and move the pipe 6 in the second direction D2.

Thus, the positioning of the inspection device 50 in the second direction D2 relative to the surface to be inspected 5 can be automatically performed. Therefore, in the present embodiment, the process up to the installation of the inspection device 50 can be automated.

In the present embodiment, the inspection device 50 further includes the coupling pipe 91 extending in the second direction D2. The inspection system 1 further includes the coupling member 20 configured to couple the pipe 6 and the coupling pipe 91. The coupling member 20 includes the central shaft portion 21 extending in the second direction D2, with one end portion in the second direction D2 inserted into one of the pipe 6 or the coupling pipe 91, and another end portion in the second direction D2 inserted into the other of the pipe 6 or the coupling pipe 91, the male thread portions 22 provided at both end portions of the central shaft portion 21 in the second direction D2 and configured to be screwed into the inside surfaces of the pipe 6 and the coupling pipe 91, and the flange portion 23 protruding radially outward from the outside surface of the central shaft portion 21 at the central portion in the second direction D2, relative to the pipe 6 and the coupling pipe 91.

The coupling member 20 is firmly fixed to both the pipe 6 and the coupling pipe 91 of the inspection device 50 by the male thread portions 22. The flange portion 23 protrudes radially outward relative to the pipe 6 and the coupling pipe 91. Thus, it is possible to suppress the collisions between the pipe 6 and the coupling pipe 91 and the surface to be inspected 5 or the like located nearby. Further, in the present embodiment, since the flange portion 23 is made of the material having the lower hardness than the surface to be inspected 5, damage to the surface to be inspected 5 can be avoided even when the flange portion 23 comes into contact with the surface to be inspected 5.

In the present embodiment, the length L1 of the pipe 6 in the second direction D2 is designed, for example, from 1.5 m to 2.5 m and the outer diameter R1 of the pipe 6 is designed, for example, from 20 mm to 25 mm.

By designing the cross-sectional dimensions of the pipe 6 (length L1 and outer diameter R1) in this way, the pipe 6 can be flexible enough to follow the curved surface shape of the target object 2 (in the present embodiment, an aircraft wing) and robust enough not to buckle when pressed in the second direction D2. From the viewpoint of achieving both flexibility and robustness, the length L1 of the pipe 6 is most preferably designed to be, for example, 2.0 m, and the outer diameter R1 of the pipe 6 is most preferably designed to be, for example, 22 mm. When the pipe 6 and the inspection device 50 are coupled, it is desirable that a length from the pipe 6 to the inspection device 50 in the second direction D2 be, for example, 30 m or less. In this way, even when the pipe 6 and the inspection device 50 are coupled, the pipe 6 is less likely to buckle when the inspection device 50 is pushed or pulled in the second direction D2 by the pipe 6.

In the present embodiment, the base 51 is provided such that the attachment position thereof is adjustable in the third direction D3.

Accordingly, the attachment position of the inspection unit 50a can be shifted in the third direction D3, so the position of the contact section 52 in third direction D3 can be adjusted. Therefore, the adhesion of each of the edge seals 8b and the brush coats 8a provided on both sides in the third direction D3 can be inspected in the narrow space 4c. Note that when inspecting the adhesion of the edge seal 8b or the brush coat 8a on the opposite side in the third direction, the inspection unit 50a may be replaced with an inspection unit 50a having a symmetrical structure in the third direction D3. Alternatively, multiple contact sections 52 or the inspection units 50a themselves may be provided spaced apart in the third direction D3 so that the adhesions of the seals 8 at two or more positions aligned in the third direction D3 can be inspected at once.

Other Embodiments

An embodiment according to the present disclosure has been described in detail with reference to the drawings. However, the specific configuration of the present disclosure is not limited to this embodiment. Design change without departing from the main gist of the present disclosure or the like is also included.

In the above-described embodiment, an example has been described in which the inspection device 50 and the inspection system 1 are used to inspect the adhesion of the seal 8 in the narrow space 4c. However, the inspection of the adhesion is not limited to the seal 8 in the narrow space 4c. The inspection device 50 and the inspection system 1 may be used to inspect the adhesion of a seal formed outside the narrow space 4c. The target object 2 to be inspected by the inspection device 50 and the inspection system 1 is not limited to the aircraft wing, and the seal formed on various devices can be inspected for adhesion.

In the above-described embodiment, a case has been described in which the automation device 10 moves the inspection device 50 in the second direction D2 to install the inspection device 50, but movement of the inspection device 50 is not limited to the use of the automation device 10. For example, an operator may grip the pipe 6 extending from the inspection device 50 and manually move the inspection device 50 in the second direction D2 to install the inspection device 50. In the case of manual operation, by marking the pipe 6 or the mechanism that holds the pipe 6 (e.g., the base 15a of the movement mechanism 15) with scales or marks, the inspection device 50 can be reciprocated within an accurate operation range.

Although one pipe 6 is provided on the one side in the second direction D2 (the back side in the front-back direction) relative to the inspection device 50, the number of the pipes 6 is not limited to one. A total of two pipes 6 may be provided one on each side of the inspection device 50 in the second direction D2 (the front-back direction). Alternatively, instead of the pipes 6, two wires may be provided one on each side of the inspection device 50 in the second direction D2 (the front-back direction), and the inspection device 50 may be moved in the second direction D2 by pulling these two wires in the second direction D2.

In the above-described embodiment, the biasing member 63 is a spring coil, but the biasing member 63 is not limited to a spring coil. For example, the biasing member 63 may be an air cylinder or the like.

In the above embodiment, the arm 62 is formed in an L-shape, but the arm 62 is not limited to an L-shape. The shape of the arm 62 can be changed as appropriate.

In the embodiment described above, an example has been described in which the brake block 82 is moved in the first direction D1 and is pressed against the upper wall surface 4c2 in the narrow space 4c. However, the moving direction of the brake block 82 is not limited to the first direction D1. The brake block 82 may be moved, for example, in the third direction D3 and pressed against the side wall surface 4cl in the narrow space 4c.

In the above-described embodiment, the sensor unit 54 is a camera, but the sensor unit 54 is not limited to a camera. The method of detecting the contact section 52 can be selected as appropriate. The sensor unit 54 may detect the position of the contact section 52 by irradiating a laser or a sound wave, for example.

Supplementary Notes

The inspection device 50 and the inspection system 1 according to the embodiments are understood as follows, for example.

(1) An inspection device 50 according to a first aspect includes the base 51 arranged facing, in the first direction D1, the surface to be inspected 5 to which the sealant is applied, the contact section 52 mounted on the base 51 and configured to come into contact with the seal 8 on the surface to be inspected 5 from the one side in the second direction D2 intersecting the first direction D1, the biasing device 60 mounted on the base 51 and configured to bias the contact section 52 in the direction from the one side to the other side in the second direction D2, and the reciprocating mechanism 65 provided at the end portion of the base 51 on the one side in the second direction D2 and configured to move the base 51 in the second direction D2, in which the biasing device 60 includes the rotary shaft 61 extending in the third direction D3 intersecting the first direction D1 and the second direction D2, the arm 62 being rotatable about the rotary shaft 61, extending at both sides in the second direction D2 with respect to the rotary shaft 61, and being provided with the contact section 52 at the end portion on the one side in the second direction D2, and the biasing member 63 provided at the end portion of the arm 62 on the other side in the second direction D2 and configured to move the contact section 52 from the one side to the other side in the second direction D2 by biasing the arm 62.

When the reciprocating mechanism 65 moves the base 51 from the one side to the other side in the second direction D2, the contact section 52 is pressed against the seal 8 in the direction from the one side to the other side in the second direction D2. At this time, the contact section 52 receives the force from the seal 8 in the direction from the other side to the one side in the second direction D2. However, the arm 62 rotates about the rotary shaft 61, causing the contact section 52 to move away from the seal 8. Accordingly, the force that the contact section 52 receives from the seal 8 can be released. On the other hand, since the biasing member 63 biases the arm 62 so that the contact section 52 moves from the one side to the other side in the second direction D2, the contact section 52 can be pressed against the seal 8 with the certain force or more. Therefore, the contact section 52 can be pressed against the seal 8 with the desired force while avoiding applying the force equal to or greater than the set value to the contact section 52 due to rotation of the arm 62.

Thus, the contact section 52 can be pressed against the boundary portion 8c of the seal 8 at the boundary between the seal 8 and the surface to be inspected 5 with the appropriate force less than the set value. When the seals 8 are formed double, the contact section 52 can be pressed against the boundary portion 8d between the seals 8 with the appropriate force less than the set value.

(2) An inspection device 50 of a second aspect, in the inspection device 50 of (1), may further include the retraction mechanism 57, the retraction mechanism 57 being mounted on the base 51, in contact with the end portion of the arm 62 on the one side in the second direction D2 from the other side in the second direction D2, expandable and retractable in the second direction D2, and configured to bias the arm 62 in the direction from the other side to the one side in the second direction D2 when expanded.

For example, when the contact section 52 receives an excessive reaction force from the seal 8, the retraction mechanism 57 extends to bias the arm 62 in the direction from the other side to the one side in the second direction D2. Thus, the contact section 52 can be completely retracted from the seal 8. Therefore, it is possible to reliably avoid applying the force equal to or greater than the set value to the contact section 52.

(3) An inspection device 50 of the third aspect, in the inspection device 50 of (1) or (2), may further include the sensor unit 54 mounted on the base 51 and configured to detect the position of the contact section 52.

Accordingly, even when the seal 8 cannot be visually recognized with the naked eye, the contact section 52 can be accurately pressed against the seal 8 to perform the seal inspection.

(4) An inspection device 50 of a fourth aspect, in the inspection device 50 of any one of (1) to (3), may further include the centering mechanism 70 positioned at the fixed position relative to the contact section 52 in the third direction D3 and configured to position the contact section 52 in the third direction D3, in which the centering mechanism 70 may include the centering blocks 72 provided facing each other in the third direction D3 and being individually movable in the third direction D3.

For example, when the wall surfaces exist on both sides of the inspection device 50 in the third direction D3, the centering mechanism 70 can be activated to press the pair of centering blocks 72 against the wall surfaces. At this time, by adjusting the positions of both the centering blocks 72 in the third direction D3, the contact section 52 can be positioned in the third direction D3 so that the sensor unit 54 and the contact section 52 are aligned in the third direction D3.

(5) An inspection device 50 of a fifth aspect, in the inspection device 50 of any one of (1) to (4), may further include the brake mechanism 80 positioned at the fixed position relative to the contact section 52 in the first direction D1 and the third direction D3, and configured to help prevent positional deviation of the contact section 52 in the second direction D2, in which the brake mechanism 80 may include the brake block 82 movable in the direction intersecting the second direction D2.

For example, when the wall surfaces exist on both sides of the inspection device 50 in one direction intersecting the second direction D2, the brake mechanism 80 can be activated to press the brake blocks 82 against the wall surfaces. Accordingly, it is possible to suppress the positional deviation of the inspection device 50 in the second direction D2 against the reaction force that the contact section 52 receives from the seal 8.

(6) An inspection system 1 of a sixth aspect includes the inspection device 50 of any one of (1) to (5), the pipe 6 coupled to the inspection device 50 from the second direction D2, and the movement mechanism 15 configured to grip the end portion of the pipe 6 on the side opposite to the inspection device 50 in the second direction D2 and move the pipe 6 in the second direction D2.

Thus, the positioning of the inspection device 50 in the second direction D2 relative to the surface to be inspected 5 can be automatically performed.

(7) An inspection system 1 of a seventh aspect, in the inspection system 1 of (6), in which the inspection device 50 may further include the coupling pipe 91 extending in the second direction D2, the inspection system 1 of the seventh aspect may further include the coupling member 20 configured to couple the pipe 6 and the coupling pipe 91, in which the coupling member 20 may include the central shaft portion 21 extending in the second direction D2, with one end portion in the second direction D2 inserted into one of the pipe 6 or the coupling pipe 91, and another end portion in the second direction D2 inserted into the other of the pipe 6 or the coupling pipe 91, the male thread portions 22 provided at both end portions of the central shaft portion 21 in the second direction D2 and configured to be screwed into the inside surfaces of the pipe 6 and the coupling pipe 91, and the flange portion 23 protruding radially outward from the outside surface of the central shaft portion 21 at the central portion in the second direction D2, relative to the pipe 6 and the coupling pipe 91.

The coupling member 20 is firmly fixed to both the pipe 6 and the coupling pipe 91 of the inspection device 50 by the male thread portions 22. The flange portion 23 protrudes radially outward relative to the pipe 6 and the coupling pipe 91. Thus, it is possible to suppress the collisions between the pipe 6 and the coupling pipe 91 and the surface to be inspected 5 or the like located nearby.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. An inspection device comprising:
a base arranged facing, in a first direction, a surface to be inspected to which sealant is applied;
a contact section mounted on the base and configured to come into contact with a seal on the surface to be inspected from one side in a second direction intersecting the first direction;
a biasing device mounted on the base and configured to bias the contact section in a direction from one side to another side in the second direction; and
a reciprocating mechanism provided at an end portion of the base on the one side in the second direction and configured to move the base in the second direction, wherein the biasing device includes
a rotary shaft extending in a third direction intersecting the first direction and the second direction,
an arm being rotatable about the rotary shaft, extending at both sides in the second direction with respect to the rotary shaft, and being provided with the contact section at an end portion on the one side in the second direction, and
a biasing member provided at an end portion of the arm on the other side in the second direction and configured to move the contact section from the one side to the other side in the second direction by biasing the arm, wherein
the biasing member is a spring coil or an air cylinder, the inspection device comprises:
a retraction mechanism, the retraction mechanism being mounted on the base, in contact with the end portion of the arm on the one side in the second direction from the other side in the second direction, expandable and retractable in the second direction, and configured to bias the arm in a direction from the other side to the one side in the second direction when expanded.

2. The inspection device according to claim 1, further comprising a sensor unit mounted on the base and configured to detect a position of the contact section.

3. The inspection device according to claim 1, further comprising:
a centering mechanism positioned at a fixed position relative to the contact section in the third direction and configured to position the contact section in the third direction, wherein
the centering mechanism includes centering blocks provided facing each other in the third direction and being individually movable in the third direction.

4. The inspection device according to claim 1, further comprising:
a brake mechanism positioned at a fixed position relative to the contact section in the first direction and the third direction, and configured to help prevent positional deviation of the contact section in the second direction, wherein
the brake mechanism includes a brake block movable in one of the first or third directions.

5. An inspection system comprising:
the inspection device described in claim 1;
a pipe coupled to the inspection device from the second direction; and
a movement mechanism configured to grip an end portion of the pipe on a side opposite to the inspection device in the second direction and move the pipe in the second direction.

6. The inspection system according to claim 5,
the inspection device further including a coupling pipe extending in the second direction,
the inspection system further comprising a coupling member configured to couple the pipe and the coupling pipe, wherein
the coupling member includes
a central shaft portion extending in the second direction, with one end portion in the second direction inserted into one of the pipe or the coupling pipe, and another end portion in the second direction inserted into the other of the pipe or the coupling pipe,
male thread portions provided at both end portions of the central shaft portion in the second direction and configured to be screwed into inside surfaces of the pipe and the coupling pipe, and
a flange portion protruding radially outward from an outside surface of the central shaft portion at a central portion in the second direction, relative to the pipe and the coupling pipe.

7. An inspection system comprising:
an inspection device comprising a base arranged facing, in a first direction, a surface to be inspected to which sealant is applied;
a pipe coupled to the inspection device from a second direction; and
a movement mechanism configured to grip an end portion of the pipe on a side opposite to the inspection device in the second direction and move the pipe in the second direction,
wherein the inspection device further includes
 a contact section mounted on the base and configured to come into contact with a seal on the surface to be inspected from one side in the second direction intersecting the first direction;
 a biasing device mounted on the base and configured to bias the contact section in a direction from one side to another side in the second direction; and
 a reciprocating mechanism provided at an end portion of the base on the one side in the second direction and configured to move the base in the second direction,
wherein the biasing device includes
 a rotary shaft extending in a third direction intersecting the first direction and the second direction,
 an arm being rotatable about the rotary shaft, extending at both sides in the second direction with respect to the rotary shaft, and being provided with the contact section at an end portion on the one side in the second direction, and
 a biasing member provided at an end portion of the arm on the other side in the second direction and configured to move the contact section from the one side to the other side in the second direction by biasing the arm, and
wherein the biasing member is a spring coil or an air cylinder.

8. The inspection system according to claim 7,
the inspection device further including a coupling pipe extending in the second direction,
the inspection system further comprising a coupling member configured to couple the pipe and the coupling pipe, wherein
the coupling member includes
 a central shaft portion extending in the second direction, with one end portion in the second direction inserted into one of the pipe or the coupling pipe, and another end portion in the second direction inserted into the other of the pipe or the coupling pipe,
 male thread portions provided at both end portions of the central shaft portion in the second direction and configured to be screwed into inside surfaces of the pipe and the coupling pipe, and
 a flange portion protruding radially outward from an outside surface of the central shaft portion at a central portion in the second direction, relative to the pipe and the coupling pipe.

\* \* \* \* \*